United States Patent
Humphrey et al.

(10) Patent No.: US 8,442,149 B2
(45) Date of Patent: May 14, 2013

(54) METHOD FOR ADAPTING DIGITAL DATA TRANSMISSION PARAMETERS TO MEASURED REPETITIVE NOISE

(75) Inventors: Leslie D Humphrey, Harlow (GB); Andrew D Wallace, Harlow (GB)

(73) Assignee: British Telecommunications Public Limited Company, London (GB)

( * ) Notice: Subject to any disclaimer, the term of this patent is extended or adjusted under 35 U.S.C. 154(b) by 1081 days.

(21) Appl. No.: 12/067,486

(22) PCT Filed: Oct. 23, 2006

(86) PCT No.: PCT/GB2006/003934
§ 371 (c)(1),
(2), (4) Date: Mar. 20, 2008

(87) PCT Pub. No.: WO2007/049016
PCT Pub. Date: May 3, 2007

(65) Prior Publication Data
US 2008/0310546 A1  Dec. 18, 2008

(30) Foreign Application Priority Data
Oct. 25, 2005 (EP) .................................. 05256607

(51) Int. Cl.
*H04K 1/02* (2006.01)
*H04L 25/03* (2006.01)
*H04L 25/49* (2006.01)

(52) U.S. Cl.
USPC .......................................... 375/296; 375/295

(58) Field of Classification Search .................. 375/296, 375/295
See application file for complete search history.

(56) References Cited

U.S. PATENT DOCUMENTS

| 5,210,518 A * | 5/1993 | Graham et al. ............... 375/351 |
| 2004/0014444 A1 * | 1/2004 | Ben Rached et al. ......... 455/135 |
| 2004/0240575 A1 * | 12/2004 | Rainbolt ........................ 375/267 |

FOREIGN PATENT DOCUMENTS

| EP | 1 359 696 | 11/2003 |
| EP | 1359696 A2 * | 11/2003 |
| WO | 00/35133 | 6/2000 |
| WO | WO 2007/049016 | 5/2007 |

OTHER PUBLICATIONS

International Search Report for PCT/GB2006/003934 dated Jan. 9, 2007.
Technical contribution SI-045 "VDSL2: Proposal for Impulse Noise Mitigation Scheme for VDSL2" at the Oct. 2004 ITU-T SG15/Q4 meeting in Stresa, Italy.

(Continued)

*Primary Examiner* — David C. Payne
*Assistant Examiner* — Brian J Stevens
(74) *Attorney, Agent, or Firm* — Patterson Thuente Pedersen, P.A.

(57) ABSTRACT

Following a transmission comprising a plurality of symbols, an error measurement is generated for each symbol, so that one may distinguish between symbols having a relatively low error and symbols having a relatively high error. A bit rate to be used for subsequent transmission is determined as a function of error measurements of those symbols that have relatively low error and as a function also of the proportion of symbols having a relatively high error, such that the bit rate reduces as the proportion increases. Measurement of the error rate and/or the durations of high and low error conditions may also be used to set other transmission parameters such as error-correcting code and interleaver settings.

8 Claims, 4 Drawing Sheets

OTHER PUBLICATIONS

Technical contribution HH-081 "VDSL2: Multi-Rate Impulse Protection" by 2-wire at the ITU-T SG15/Q4 meeting in Hawaii, Jan. 2005.

Mujcic, A.; Suljanovic, N.; Zajc, M.; Tasic, J.F.; "Influence of data frame duration on performance of BITCM system over HV power line," Joint IST Workshop on Mobile Future, 2004 and the Symposium on Trends in Communications, SympoTIC '04, Oct. 24-26, 2004, pp. 150-153.

Crabtree, B., et al., "Equitable quality video streaming," Apr. 2008, BT Group Chief Technology Office, Adastral Park, Martlesham Heath, Ipswitch, IP5 3RE, UK.

European Search Report, Application No. EP 05256607.2, dated Mar. 29, 2006, 7 pages.

Written Opinion of the International Searching Authority, Application No. PCT/GB/2006/003934, dated Apr. 29, 2008, 6 pages.

Application No. EP06794870.3, dated Apr. 15, 2011, *Communication about intention to grant a European Patent*, 4 pages.

Application No. EP06794870.3, dated Mar. 22, 2011, *Result of Consultation*, 3 pages.

Application No. EP06794870.3, dated Oct. 5, 2010, *Annex to the Communication/Summons to attend oral proceedings*, 4 pages.

Application No. EP06794870.3, dated Mar. 27, 2009, *Communication from the Examining Division/Annex to the Communication*, 5 pages.

Application No. PCT/GB2006/003934, *The International Search Report*, mailed Sep. 1, 2007, 2 pages.

* cited by examiner

METHOD FOR ADAPTING DIGITAL DATA TRANSMISSION PARAMETERS TO MEASURED REPETITIVE NOISE

PRIORITY CLAIM

This application is the U.S. national phase of International Application No. PCT/GB2006/003934 filed 23 Oct. 2006 which designated the U.S. and claims priority to European Application No. 05256607.2 filed 25 Oct. 2005, the entire contents of each of which are hereby incorporated by reference.

FIELD OF THE INVENTION

The present invention is concerned with modulation and demodulation systems for digital data transmission.

BACKGROUND OF THE INVENTION

Whilst it is applicable to a wide range of different systems, one use of particular interest is in the context of ADSL transmission technology of the type specified by the ITU-T in G.992.x. This is a DMT (discrete multitone transmission) system in which a large number (of the order of 200) carriers are used, at different frequencies, each carrier being modulated using quadrature amplitude modulation (QAM). The system is adaptive in the sense that the total transmitted data rate is automatically adjusted according to the prevailing properties of the transmission link in use at the time. The setting of the data rate occurs during an initialization procedure in which (inter alia):

(a) the transmitter sends test transmissions to the receiver;
(b) the receiver measures the operating margins;
(c) a decision is made as to the maximum data rate that the link can support;
(d) decisions are made as to the allocation of bits among the different carriers or "bins" according to the relative quality of the link at different frequencies;
(e) these decisions are implemented at both transmitter and receiver.

In most cases, one is considering a transceiver, so that these steps need to be performed for both transmission directions.

In QAM, each transmitted symbol has a phase and amplitude corresponding to a selected one of a limited set of points in the phase plane (referred to as the "constellation"). The operating margin will be discussed in more detail below, but basically is a measure of the extent to which each received symbol is observed to deviate in phase and/or amplitude from the nearest permitted point of the constellation.

In particular it looks at improvement of the resilience of ADSL technology to impairments which vary strongly with time.

We have observed that ADSL is unduly vulnerable to interference from non-stationary noise, such as repetitive electrical impulse noise (REIN) or isolated broadband noise events.

In particular, current ADSL modems have a scalar measure of margin, only suitable for use when the noise impairments do not change significantly with time. In situations where the line is subject to time varying impairments, modems from different vendors behave quite differently, some are essentially unable to calculate the bit rate at which they can operate with stability.

This leads to many modems being unable to stay in synchronization with the modem at the other end, leading to poor customer experience.

SUMMARY OF THE INVENTION

According to the present invention there is provided method of data transmission comprising:
making a transmission comprising a plurality of symbols;
generating for each symbol an error measurement;
distinguishing between symbols having a relatively low error and symbols having a relatively high error;
determining a bit rate to be used for subsequent transmission as a function of error measurements of those symbols that have relatively low error and as a function also of the proportion of symbols having a relatively high error, such that the bit rate reduces as the proportion increases.

Other aspects of the invention are defined in the claims.

BRIEF DESCRIPTION OF THE DRAWINGS

Some embodiments of the invention will now be described, by way of example, with reference to the accompanying drawings, in which.

DETAILED DESCRIPTION OF THE INVENTION

Current ADSL modems describe their operating margin using a single number only. This works well where the impairment signal's spectral characteristic does not change rapidly with time. However, on many lines, this is not true.

The embodiment of the invention now to be described offers a modem with means to classify, on a symbol-by-symbol basis, whether an abnormal, non-stationary element is present in a received symbol, resulting in a "normal/abnormal" classification. Separate average margins are then maintained for normal and abnormal signal conditions. Furthermore the expectation of the duration of normal and abnormal conditions is calculated, along with the 15 minute maximum duration of the abnormal condition. Such information is of great value in choosing the data rate to be used, and/or other operating parameters, such as interleaver settings (if interleaving is used) and the overhead values for Reed-Solomon (RS) or other error-correcting codes, tailored to an individual line, especially if this information is monitored regularly. These measurements can be made during test transmissions, at initialization, or during live transmission, with a view to adapting the settings already in force.

Given the enhanced margin estimation capability, the modem is better equipped to negotiate a set of operating parameters with the modem at the other end, to achieve stable, error-free operation.

This example uses a DMT transmission link with an array of orthogonal carriers modulated using 2N-QAM (quadrature amplitude modulation) at a symbol rate R. N varies from carrier to carrier to allow those carriers where the signal-to-noise ratio is good to carry more information than those carriers where the signal to noise ratio is bad. At the receiver, after equalization for the frequency/attenuation and phase change character of the transmission channel, a noise impaired version of each transmitted symbol is received. Because the nominal positions of the 2N-QAM constellation encoder are known, an error distance can be calculated for each symbol, based on the sum of the squared distances of the actual received constellation from the nominal constellation grid. Indeed, if trellis coded modulation is in use on the link, the Viterbi algorithm, used to perform maximum likelihood decoding of the received symbol, will calculate a path error metric for the chosen path as each symbol is decoded.

Figure 1:
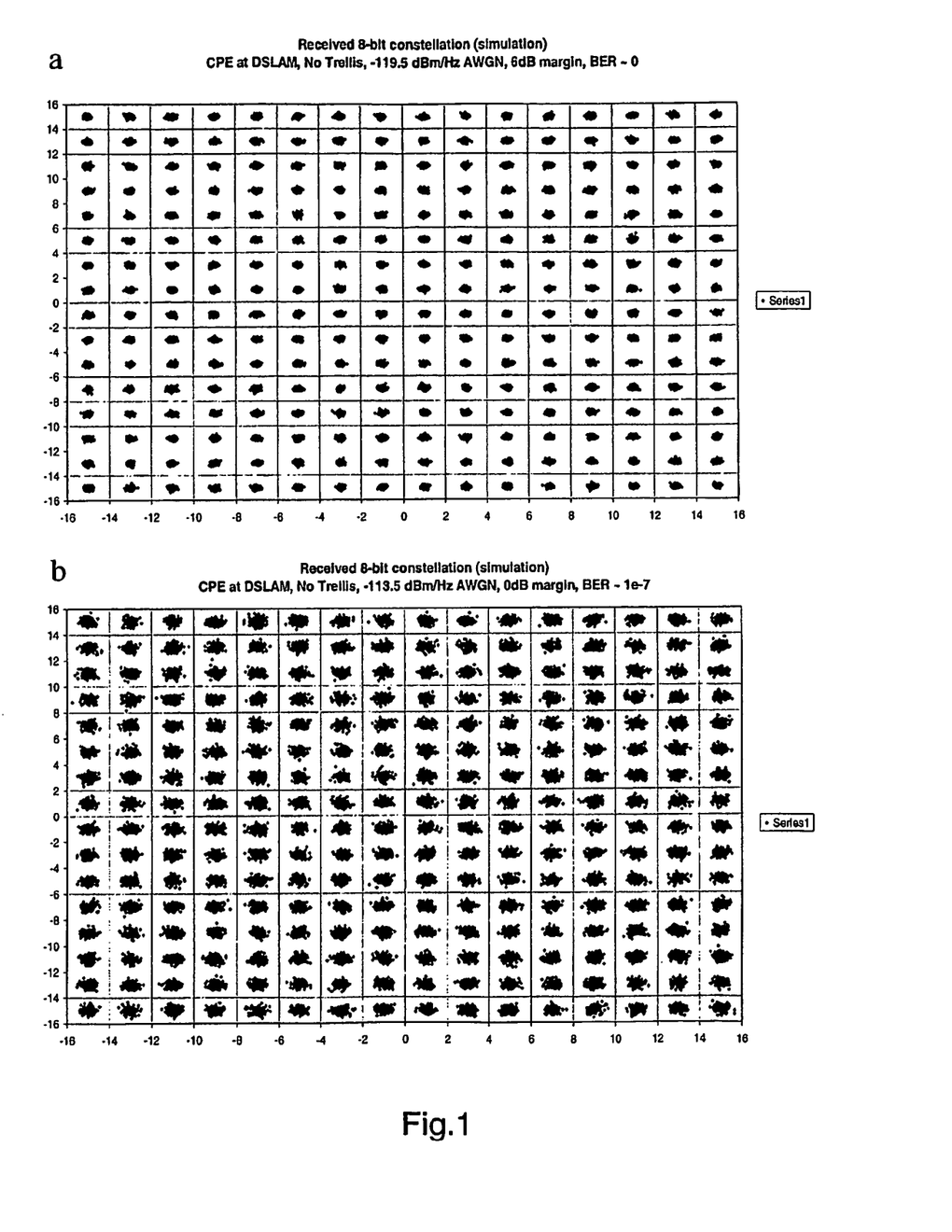
FIGS. 1, 2 and 3 are charts showing path error metric observations.
Figure 2:
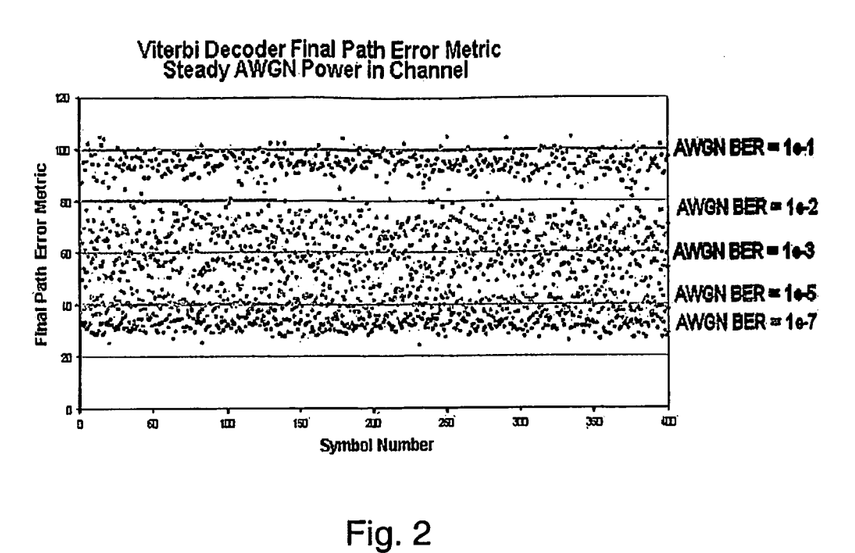

FIGS. 1a and 1b show 256-QAM constellations as seen at the receiver with 6 dB and 0 dB margin respectively, when operating with the trellis coder off. The value of this path error metric has very strong correlation with the likely number of receiver decode errors. The chart of FIG. 2 shows the result of calculating a path error metric on a symbol-by-symbol basis for a transmission channel operating with additive white Gaussian noise (AWGN), along with the error-rate which resulted in the transmission channel when this level of noise was present. A second simulation (FIG. 3) shows how the path error metric varies with time on a channel where the noise level is fluctuating between a normal and an abnormal condition, along with the path error metric calculated in a channel subject to white noise causing a bit-error ratio (BER) of $10^{-7}$.

Figure 3:
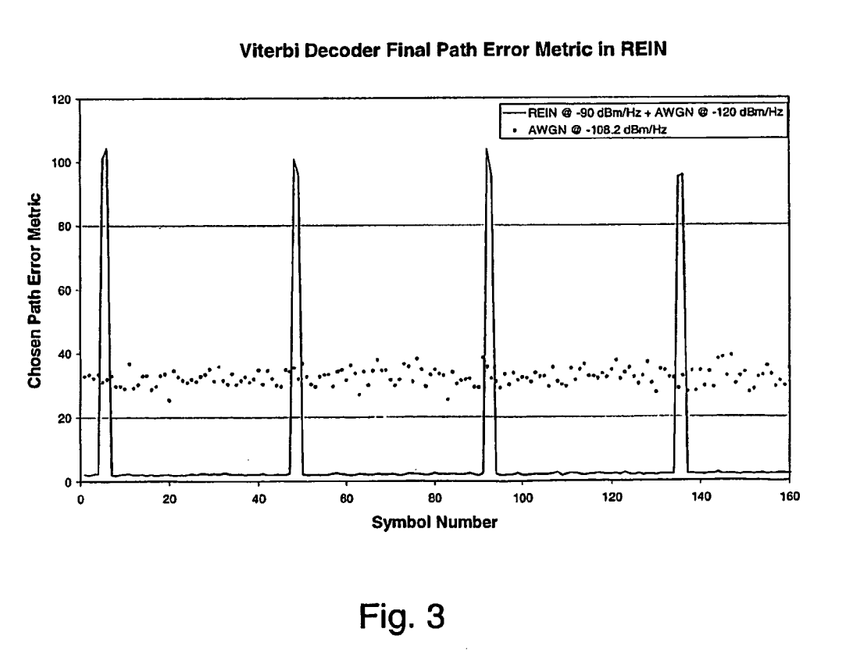

This type of condition occurs frequently in telephony networks, when electrical equipment nearby injects noise back into the mains supply as a result of the operation of thyristor power control circuitry or switched mode power supplies. It has become known as regular electrical impulse noise or REIN. It can be seen that a path error metric of 30 in this case would be a suitable threshold for the normal/abnormal decision, and furthermore it can also be seen that the normal error metric has an average value of around 2, the abnormal error metric has a value around 100, that the expectation of the duration of the normal state is approximately 38 symbols and the expectation of the duration of the abnormal state is approximately 2 symbols. If an adaptive threshold is used, REIN can be identified as an issue even before it starts to cause transmission errors. In this case, the abnormal state could be flagged when the current symbol path error metric was more than 3 standard deviations from the average normal path error metric. Symbol metrics computed during the abnormal state are not included in the computation of the standard deviation of the symbol error metric.

The $10^{-7}$ BER case defines the 0 dB margin point. So, using the scale shown on this graph, if the error metric is 30, the operating margin is 0 dB. As the error metric is the mean square distance of the symbol from a symbol on the nominal constellation grid, if the noise in the channel reduces by 3 dB, the error metric will halve. A simple way to relate error metric to symbol-by-symbol margin in dB would therefore be:

Symbol margin $M=10*(\log_{10}(\text{error metric for BER}=10^{-7})-\log_{10}(\text{symbol error metric}))$ Or, equivalently, Symbol margin $M=10*(\log((\text{error metric for BER}=10^{-7}/\text{symbol error metric}))$ Note that a high error rate implies a high value for E but a low value for M.

A simple state machine can then be used to process the symbol-by-symbol margin. If the margin is greater than a threshold, the state machine enters the "normal" state otherwise the state machine enters the "abnormal" state. Average values of the margin are then separately maintained for the two states.

The number of symbols for which the state persists is computed, in turn allowing an expectation value for the duration of the two states to be calculated. These measurements are useful to determine the maximum length of erasure which the RS codec will need to cover and also to determine the proportion of the channel which should be devoted to RS overhead.

Figure 4:
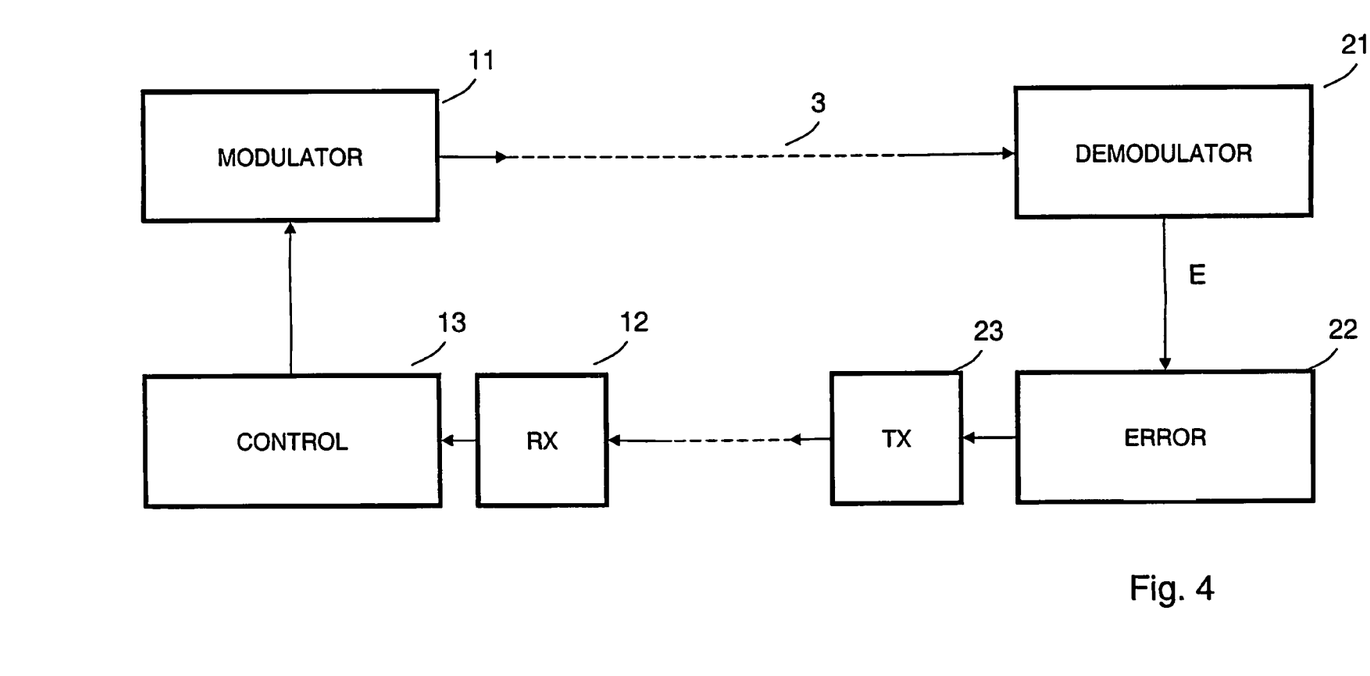
FIG. 4 is a block diagram of a transmitter and receiver.

FIG. 4 shows a first station 1 having a QAM modulator 11 which transmits to a second station 2 via a telecommunications link 3. A receiver 12 receives reception quality reports from the second station and passes them to a control unit 13 which controls the bit rate and other parameters of the modulator 11, as will be described below. The second station has a QAM receiver 21 and an error analysis unit 22 which receives error metrics E from the receiver 21 and sends quality reports back to the first station via a transmitter 23. If desired the transmitter 23 may have the same structure as the transmitting parts of the first station and conversely the receiver 12 may have the same structure as the receiving parts of the second station. Many of the processing steps to be described can, as desired, be performed at one end or the other, for example, the error analysis unit 22 could transmit raw error measurements, or it could perform all the processing and send the results to the control unit 13, or the processing could be shared between them.

Figure 5:
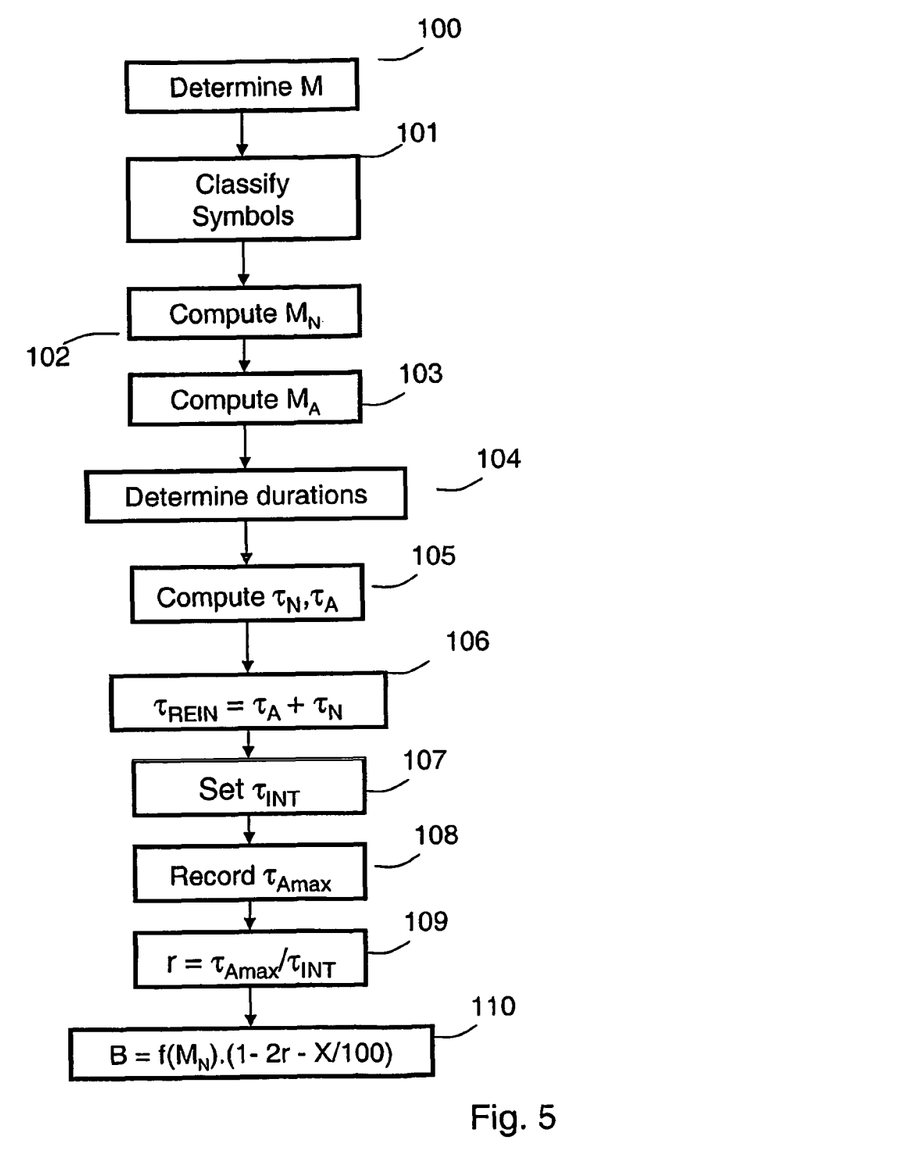
FIG. 5 is a flowchart showing the operation of the system of FIG. 4.

The operation of the modem control systems during initialization performs these measurements by performing the steps of the following flowchart:

100. Determine the error metric E and symbol margin M for each symbol, as described above.

101. Classify each symbol: if E>Th, the symbol is deemed abnormal; otherwise it is considered normal, where Th is a threshold equal to the mean symbol error metric E of the normal symbols plus three times the standard deviation of this metric of the normal symbols.

102. Compute the average $M_N$ of the margins for the normal symbols. Alternatively a low pass filter function, such as a leaky integrator or sliding window function can be applied to the symbol margin. A low pass cut-off frequency of 1 Hz or a 1 s window gives a useful moving average. If desired, the standard deviation $\sigma_N$ can also be calculated, for reporting purposes.

103. Compute the average $M_A$ of the margins for the abnormal symbols. Alternatively a low pass filter function, such as a leaky integrator or sliding window function can be applied to the abnormal symbol margin. A low pass cut-off frequency of 1 Hz or a 1 s window gives a useful moving average. Again, the standard deviation AA may be calculated.

104. Determine the duration of each normal and each abnormal series of symbols. In this example this is performed by means of a state machine which in principle switches to a normal state upon observation of a normal symbol and switches to an abnormal state upon observation of an abnormal symbol.

A state machine is needed to determine whether the line is in the abnormal or the normal state and also to determine the period between noise bursts. Movement into the abnormal state is triggered by a single abnormal symbol. Exit from the abnormal state is triggered by two consecutive normal symbols—the state machine should have a persistence check before leaving the REIN state.

It should also not update period estimates if an isolated impulse occurs in the middle of the quiet period. This is another persistence check. The persistence check could be driven by the current estimate of REIN noisy period max length.

In a more sophisticated version, a single isolated erasure outside the expected noisy window (see below) is not sufficient to cause a switch to the abnormal state, and a single isolated good symbol during the impulse should not be counted as an escape from the abnormal state, The persistence threshold could be fixed or dynamically set as a proportion of the expected noise burst length estimated by the algorithm.

105. Compute the expected duration $\tau_N$ for the normal state. The exact duration of the normal state will vary from one REIN burst to the next, the expectation value is calculated with a response time of the order of 1 s, either using a low pass filter with a 1 Hz cut-off frequency or a sliding window moving average.

Compute the expected duration $\tau_A$ for the abnormal symbols. The method used should be as for $\tau_N$.

106. The sum of the two will give an indication of the REIN period, $\tau_{REIN} = \tau_A + \tau_N$.

107. Set the interleaver delay $\tau_{INT}$, discussed below: its value is similar to that of $\tau_{REIN}$.

108. Record the maximum duration $\tau_{Amax}$ for the abnormal state, in the 15 minute data collection period. (Modems collect a variety of statistical information over a 15 minute period).

Of course, at startup, the threshold Th used at Step 102 is undefined (as it is not yet known which symbols are in the abnormal state). One way to proceed is as follows:

200. Observe a number of symbols over a short period (say 4000 symbols or 1 second) and record the symbol error metric for each;

201. Assuming that the transmission conditions are essentially switching between two states, the statistical distribution of the metrics will be binormal, with two peaks, as illustrated in FIG. 3. We calculate the mean and standard deviation of all the metrics whose values lie below the trough or minimum between the two peaks;

202. If no minimum is observed, then we assume that the signal is not exhibiting REIN behavior (i.e. there are no abnormal symbols) and take the mean and standard deviation of all the recorded metrics;

203. The normal/abnormal threshold Th may now be set at the mean error metric E plus three times the standard deviation determined in (201) or (202) and the receiver may now begin classifying each symbol as it arrives.

204. Inevitably, noise conditions will change with time, the mean and standard deviation figures used in the ongoing classification of the symbols as normal or abnormal should be updated during live operation of the modem.

Having made these measurements, they can then be used in determining the settings to be used.

The symbol margin $M_N$ during "normal" state can be used to set transmission channel capacity, as high quality transmission can be achieved in this interval.

Considering first non-interleaved operation, in non-interleaved mode, given a target of error-free transmission, the transmission bit rate must be set so that each DMT carrier is operating with at least the configured target margin during the abnormal state.

This means that the noise or error signal must be enumerated in the frequency domain for each symbol, with a peak-hold algorithm used to record the worst case noise signal on each carrier individually, over a 1 s channel observation window.

The total transmission rate and bits and gains per carrier are then adjusted in the conventional manner to achieve operation with at least the configured target margin on each carrier, with respect to the worst case noise signal computed during training.

A second example envisages (as in G.992.x) interleaving, and the use of Reed Solomon codes: thus the errors occasioned due to the inability of the link to sustain this capacity during a noise burst can be accommodated by the R-S error correction. It is preferred however to increase the error-correcting capability to accommodate this. The capacity is, in consequence, reduced slightly to account for the RS overhead needed for correction of the errors occurring during the "abnormal" state. A further reduction in capacity may be needed to account for the reduction in efficacy of adaptive processes within the modem such as the digital phase locked loop and frequency domain equalizer adaptation.

In more detail, in a conventional modem, the margins M are used to determine the available transmission rate in accordance with a function which here we refer to as f—that is, the average transmission rate is f(M) bits per symbol. This average number of bits per symbol is then fed to the training process which allocates bits (unequally in most cases) among the DMT bins. In the modem according to the present embodiment of the invention, we use $M_N$ to determine the transmission rate. Then we reduce it to take account of the effect of the REIN, using the duty ratio $r = \tau_{Amax}/\tau_{INT}$ (Step 108 in FIG. 5). Theoretically we could just reduce the rate by this factor to take account of the fact that little or no useful reception will occur on abnormal symbols, but in fact we reduce it by twice this to allow for extra RS overhead* and by a further X % to allow for reductions in the efficacy of decoder processes such as phase-locked loop tracking and equalizer adaptation. Thus the available transmission rate B expressed as an average number of bits per symbol is set (Step 109) as $$B = f(M_N)(1 - 2r - X/100)$$

where f( ) is the same function as used in the conventional system (e.g. using a look-up table). Typically, X might be 5%. Thus, the rate B is a function of error measurements of those symbols that have relatively low error and is a function also of the proportion of symbols having a relatively high error, but is otherwise independent of the error measurements of those symbols that have relatively high error.

Note that B is the actual useful data payload and does not include any RS or any other kind of overhead bits.

Once B has been determined then it is fed into the usual training algorithm to determine the numbers of bits to be allocated to each DMT bin.

It has already been mentioned that Reed-Solomon code settings can be adapted in accordance with the measured performance of the transmission link. More specifically, the larger is r, the more errors there are and therefore more redundancy is required. Thus, the degree of redundancy is varied as an increasing function of r.

We have already calculated r as the proportion of symbols within the interleaver time span lost to erasure caused by REIN and $\tau_{REIN}$ as the REIN period.

If the positions of the erasure bytes can be flagged at the input to the RS decoder, (see below) then a proportion of RS check bytes equal to r must be added to the user data. If erasure driven decoding is not possible, the proportion of RS check bytes must be increased to 2r.

Typically, RS codec hardware has implementation restrictions. It is common for the number of check bytes R to be restricted to even values up to and including 16 bytes per RS code word, with the number of bytes in a code word N being up to 255 inclusive.

S, the number of RS code words in a DMT symbol and D, the depth of the interleaver in RS codewords must also be chosen, within the constraints imposed by the hardware capabilities, such that R/N>=2r (or r if erasure driven decode is possible).

The framing of RS code words does not need to be locked to DMT symbol boundaries, in other words, S is not just restricted to ⅓, ½, 1, 2, 3 etc.

Where interleaving is in use, the interleaver settings may also be adapted. The aim of interleaving is that, when a burst occurs, the bits that are affected by it are distributed among a number of codewords so that, with the use of error correcting codes: thus we propose that the interleaver length be varied as an increasing function of the average burst duration $\tau_{Amax}$.

The optimum interleaver time span to use is $\tau_{REIN}$, however, hardware restrictions often mean that this exact value will not be possible. For example, some current chip sets restrict interleaver depth to 1, 2, 4, 8, 16, 32 or 64 RS codewords.

For a particular S and D, the interleaver delay is given by $$\tau_{INT} = S*D/4000$$

The optimum setting for $\tau_{INT}$ will be the highest available value less than $\tau_{REIN}$.

Another enhancement—again using interleaving—is to use information about which symbols are in error to enhance the operation of the RS correction. The principle here is to flag those bytes that are recovered from a symbol deemed to be abnormal—i.e. those with E>Th. When the R-S decoder comes to decode a binary word that contains a flagged byte, then provided the number of errors that the word contains is within the capability of the decoder to correct it, the flags are ignored. If, however the number of errors is such that the errors are detectable but not correctable, this means that the received word is not a valid codeword, but it is ambiguous as to which bits should be inverted so as to turn it into a valid codeword. In such circumstances, the decoder proceeds by choosing that one correction that involves inversion of a flagged bit (or, if there is more than one, the one that involves inversion of the largest number of flagged bits). In more detail, we have already classified symbols as normal or abnormal, based on identifying those symbols that have E>Th. Also, the de-interleaver works in a strictly defined order, therefore the bytes at the output of the de-interleaver can be flagged as derived from normal or abnormal symbols. When the error location information is passed to the RS decoder, the error correction capability of the code is doubled in decoders capable of erasure driven decode. Potentially this can result in halving the amount of RS overhead required.

When flagging symbols as abnormal for this purpose we prefer, as indicated above, to flag those symbols that have M>Th. In the alternative, it would, if desired, be possible to (a) flag those symbols that have M>Th, plus any symbols deemed abnormal due to clustering; or (b) generate a prediction window and deem all symbols falling within it to be bad.

The above discussion about Reed-Solomon codes also applies to other kinds of error-correcting codes, such as other BCH codes etc—although, currently, only Reed Solomon codes are implemented as an outer code by ADSL/2/2+ chip sets).

Where interleaving is not used, one may choose to simply refrain from transmitting data on symbols expected to be abnormal. Necessarily these must be symbols predicted to be abnormal and therefore a prediction mechanism (e.g. by generating a prediction window and deeming all symbols falling within it to be bad) would be involved. Alternatively, symbols scheduled to be transmitted during a predicted burst period could be used, albeit at a lowed data rate, by:

(i) generating a window as before to identify (in advance) symbols as good (expected to be normal) or bad (expected to be abnormal);

(ii) use $M_N$ to calculate a high data rate (much as before);

(iii) use $M_A$ to calculate a low data rate;

(iv) perform a separate training process for the two data rates to obtain bit allocations etc.

(v) transmit "good" symbols at the high rate and "bad" symbols at the lower rate.

Switching to a lower (or zero) data rate during periods predicted as likely to contain burst errors is known per se, see technical contribution SI-045 "VDSL2: Proposal for Impulse Noise Mitigation Scheme for VDSL2" at the October 2004 ITU-T SG15/Q4 meeting in Stresa, Italy; also technical contribution HH14-081 "VDSL2: Multi-Rate Impulse Protection" by 2-wire at the ITU-T SG15/Q4 meeting in Hawaii, January 2005.

Furthermore, if a modem were to store, in flash, the symbol-by-symbol error metric for a period of one minute each time that a broadband link loses synchronization, useful information about the reason why a broadband fault occurs would be available for the network operator. This information could be retrieved from the modem when the line was next operational.

The above description assumes that prediction of the repetition rate of noise bursts is determined by observation of error statistics. An alternative approach is to assume (either a priori or as a consequence of observation that the periodicity of the observed noise statistics is close to that of the local supply frequency) that the interference is indeed caused by power switching and to lock the prediction window in frequency and/or phase to the local mains supply.

The invention claimed is:

1. A method of data transmission between a transmitter and a receiver, the method comprising:
    transmitting a transmission comprising a plurality of symbols to a receiver;
    generating for each symbol an error measurement;
    classifying symbols having a relatively low error as normal and symbols having a relatively high error as abnormal;
    determining an error-related parameter for symbols classified as normal;
    determining a bit rate to be used for subsequent transmission as a function of the error-related parameter for symbols classified as normal and as a function also of the proportion of symbols classified as abnormal, such that the bit rate reduces as the proportion of abnormal symbols increases.

2. A method according to claim 1, further comprising choosing an error correcting code to be used for transmission, the code having a greater or lesser error-correcting capability according to whether the proportion of symbols classified as abnormal is great or small.

3. A method according to claim 1, further comprising supplying to a decoder operating in accordance with an error-correcting code, flags indicating which bits were derived from a symbol classified as abnormal and the decoder in cases of ambiguity prefers correction of flagged bits over correction of unflagged bits.

4. A method according to claim 1, further comprising supplying to a decoder operating in accordance with an error-correcting code, flags indicating which bits were derived from a symbol classified as abnormal; wherein the decoder in cases of ambiguity prefers correction of flagged bits over correction of unflagged bits, and wherein the bits derived from symbols are interleaved.

5. A data transmission system comprising:
    modulation means for making a transmission comprising a plurality of symbols;
    a receiver operable to receive the transmission and generate for each symbol an error measurement;
    control means to classify symbols having a relatively low error as normal and symbols having a relatively high error as abnormal, to determine an error-related parameter for symbols classified as normal and to determine a bit rate to be used for subsequent transmission as a function of the error-related parameter for symbols classified as normal and as a function also of the proportion of symbols classified as abnormal, such that the bit rate reduces as the proportion of abnormal symbols increases.

6. A data transmission system according to claim 5 wherein the control means is further operable to choose an error-correcting code to be used for transmissions, the code having a greater or lesser error-correcting capability according to whether the proportion of symbols classified as abnormal is great or small.

7. A data transmission system according to claim 5 further comprising a decoder operating in accordance with an error-correcting code and wherein the control means is further operable to supply to the decoder flags indicating which bits were derived from a symbol classified as abnormal and the decoder in cases of ambiguity preferring correction of flagged bits over correction of un-flagged bits.

8. A data transmission system according to claim 7 wherein the bits derived from the symbols are interleaved.

\* \* \* \* \*

UNITED STATES PATENT AND TRADEMARK OFFICE
CERTIFICATE OF CORRECTION

| | |
|---|---|
| PATENT NO. | : 8,442,149 B2 |
| APPLICATION NO. | : 12/067486 |
| DATED | : May 14, 2013 |
| INVENTOR(S) | : Humphrey et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1239 days.

Signed and Sealed this
Sixteenth Day of December, 2014

Michelle K. Lee
*Deputy Director of the United States Patent and Trademark Office*